Patented Dec. 23, 1930

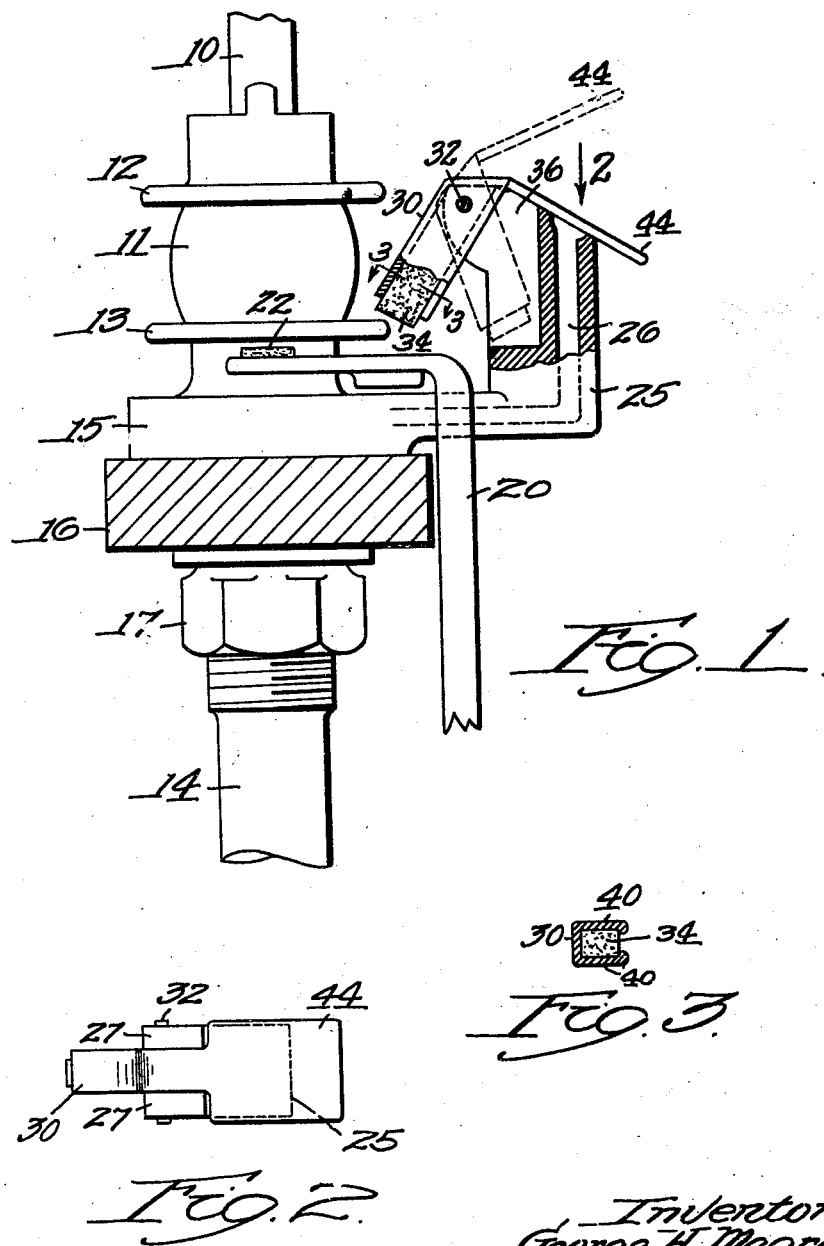

1,786,252

UNITED STATES PATENT OFFICE

GEORGE H. MAGRATH, OF WHITINSVILLE, MASSACHUSETTS

BEARING SUPPORT FOR SPINNING OR TWISTING SPINDLES

Application filed October 2, 1929. Serial No. 396,812.

This invention relates broadly to spindles of the kind used in spinning or twisting yarn and more particularly to the heavier types of spindles.

It is the general object of my invention to improve the construction of the bearing supports for such spindles, to the end that the spindles may be more easily held from rotation and more easily supplied with oil.

It is the usual practice to stop and hold the heavier spindles from rotation by a braking device actuated by the knee of the operator and pressed upward against the lower flange of the driving whirl of the spindle.

One object of my invention relates to the provision of improved means for receiving and resisting this upward pressure of the knee brake on such a spindle.

Another object is to provide a device for the above defined purpose which also serves to cover the oil hole in the spindle bearing support and which may be quickly and easily moved to uncover the oil hole or to permit removal of the spindle from its bearing support.

My invention further relates to arrangements and combinations of parts which will be hereinafter described and more particularly pointed out in the appended claims.

A preferred form of the invention is shown in the drawings in which

Fig. 1 is a partial side elevation of a spindle embodying my improvements, certain parts being shown in section;

Fig. 2 is a detail plan view, looking in the direction of the arrow 2 in Fig. 1; and Fig. 3 is a detail sectional view, taken along the line 3—3 in Fig. 1.

Referring to the drawings, I have shown a portion of a spindle 10 having a driving whirl 11 secured thereon and provided with upper and lower flanges 12 and 13. The spindle 10 is rotatable in a spindle bearing 14 forming a part of a bearing support 15 clamped to the usual spindle rail 16 by a binding nut 17.

A knee brake 20 rests loosely on the bearing support 15 and is provided with a depending portion to be engaged by the knee of the operator and with friction pads 22 positioned to engage the under side of the lower flange 13 of the spindle whirl 11.

The bearing support 15 has a laterally and upwardly projecting portion 25 in which an oil passage 26 is formed. The upper end of the projecting portion 25 is provided with ears 27 between which a retaining and friction member 30 is pivotally mounted, as on a cross pin 32. The cross pin is positioned substantially above the lower flange 13 of the whirl 11 and is preferably adjacent the periphery of the upper flange.

A piece of friction material 34, such as leather, fibre or specially treated wood, is secured in the retaining member 30 and is positioned to be engaged by the upper face of the flange 13 when the spindle is lifted slightly by the knee brake 20. Such engagement prevents further upward movement of the spindle which is thus readily brought to rest and firmly held from rotation by the upward pressure of the brake thereon.

The inner face of the projecting portion 25 is slotted, as indicated at 36, to receive the member 30 and to permit the same to swing backward away from the flange 13 of the whirl 11. When the member 30 is thus swung backward, the spindle 10 may be removed by direct upward movement.

The member 30 is preferably formed of sheet metal and is provided with side portions 40 (Fig. 3) which are adapted to be pressed inward and clamped firmly about the friction material 34 and to hold the same from displacement.

A projection or cover 44 is also formed on the member 30 and is preferably integral therewith. This projection 40 normally slants downward and outward and covers the upper end of the oil passage 26. When more oil is needed, the projection or cover 44 may be readily swung upward to the position shown in dotted lines in Fig. 1 and as soon as released will fall by gravity to the full line operative position, in which the oil passage 26 is securely closed. The projection 44 acts as a counterweight to hold the member 30 in operative position.

The retaining member thus effectively serves the purpose of preventing upward movement of the spindle 10 by the knee brake 20 and also of providing a closure for the oil passage which may be readily removed when oiling is necessary.

Having thus described my invention and the advantages thereof, I do not wish to be limited to the details herein disclosed, otherwise than as set forth in the claims, but what I claim is:—

1. The combination with a spindle having a driving whirl with upper and lower flanges, a bearing support for said spindle and a knee brake for said spindle, of a retaining device pivoted on said bearing support to swing about a horizontal axis and extending downward and inward to a point above and adjacent an upper rotating surface of said spindle, said device having a friction member normally positioned to be engaged by said upper surface of said spindle whirl and to thereby limit upward movement of said spindle by said knee brake, said point of horizontal pivotal support being located substantially above said rotating surface and outside of but adjacent the periphery of said whirl.

2. The combination in a spindle constructed as set forth in claim 1, in which said bearing support is provided with an oil passage and in which said friction device has a laterally projecting counterweight portion normally holding said device in operative position and simultaneously acting as a closure for the upper end of said oil passage.

3. The combination in a spindle constructed as set forth in claim 1, in which said retaining device comprises a pivoted member having a grooved portion and in which a block of friction material is secured in said grooved portion of said member, the sides of said grooved portion of said pivoted member being displaced inwardly and gripping said block of friction material.

In testimony whereof I have hereunto affixed my signature.

GEORGE H. MAGRATH.